(12) United States Patent
Ou et al.

(10) Patent No.: US 11,972,077 B1
(45) Date of Patent: Apr. 30, 2024

(54) RESETTING SYSTEM AND METHOD

(71) Applicant: Himax Technologies Limited, Tainan (TW)

(72) Inventors: Yu-Nian Ou, Tainan (TW); Chun-Kai Chuang, Tainan (TW); Pei-Yuan Hung, Tainan (TW); Yu-Hsiang Lin, Tainan (TW)

(73) Assignee: Himax Technologies Limited, Tainan (TW)

( * ) Notice: Subject to any disclaimer, the term of this patent is extended or adjusted under 35 U.S.C. 154(b) by 0 days.

(21) Appl. No.: 18/141,369

(22) Filed: Apr. 29, 2023

(51) Int. Cl.
| | |
|---|---|
| *G06F 3/041* | (2006.01) |
| *G06F 3/0488* | (2022.01) |
| *G06F 3/14* | (2006.01) |
| *G09G 5/00* | (2006.01) |
| *G09G 5/14* | (2006.01) |

(52) U.S. Cl.
CPC ........ *G06F 3/04166* (2019.05); *G06F 3/0412* (2013.01); *G06F 3/0488* (2013.01); *G06F 3/14* (2013.01); *G09G 5/006* (2013.01); *G09G 5/14* (2013.01); *G06F 2203/04104* (2013.01); *G06F 2203/04808* (2013.01); *G09G 2340/10* (2013.01); *G09G 2354/00* (2013.01); *G09G 2380/10* (2013.01)

(58) Field of Classification Search
None
See application file for complete search history.

(56) References Cited

U.S. PATENT DOCUMENTS

| | | | | |
|---|---|---|---|---|
| 10,418,065 | B1* | 9/2019 | Guckenberger | G11B 27/105 |
| 2011/0019239 | A1* | 1/2011 | Kojima | G06F 3/0488 |
| | | | | 358/401 |
| 2015/0099968 | A1* | 4/2015 | Jamello | G06F 3/04845 |
| | | | | 600/467 |
| 2017/0313248 | A1* | 11/2017 | Kothari | H04N 23/69 |
| 2019/0253611 | A1* | 8/2019 | Wang | H04N 23/695 |
| 2020/0192544 | A1* | 6/2020 | Chung | G06F 3/04166 |
| 2023/0134287 | A1* | 5/2023 | Lee | G06F 3/0446 |
| | | | | 345/174 |

FOREIGN PATENT DOCUMENTS

| | | | | | |
|---|---|---|---|---|---|
| CN | 102413257 | B | * | 1/2016 | ......... G06F 3/04855 |
| CN | 105278843 | A | * | 1/2016 | |
| CN | 109844816 | A | * | 6/2019 | ......... G06F 3/0346 |
| MY | 182662 | A | * | 1/2021 | |
| WO | WO-2016157418 | A1 | * | 10/2016 | ......... G01C 21/3664 |

* cited by examiner

*Primary Examiner* — Duane N Taylor, Jr.
(74) *Attorney, Agent, or Firm* — Donald E. Stout; Stout, Uxa & Buyan, LLP

(57) ABSTRACT

A resetting system includes a driver that controls a touchscreen, the driver including a driver communication interface that defines a bus for transferring a transfer signal; and an on-screen display (OSD) device that generates an OSD signal representing a predetermined reset image in response to a predetermined event, the OSD signal superimposing over pixels and graphics data to be rendered on the touchscreen; and a host that transfers the transfer signal to or from the driver, the host including a host communication interface that defines the bus for transferring the transfer signal to or from the driver.

20 Claims, 5 Drawing Sheets

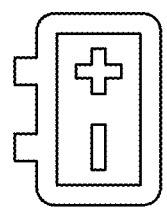
FIG. 3A — battery warning
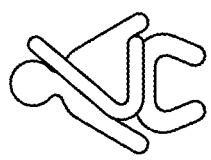
FIG. 3B — seat belt warning
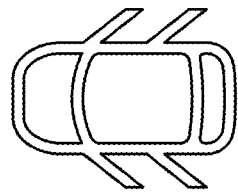
FIG. 3C — door open

RESETTING SYSTEM AND METHOD

BACKGROUND OF THE INVENTION

1. Field of the Invention

The present invention generally relates to a resetting system and method, and more particularly to a resetting system and method that is adaptable for use with an automotive touchscreen.

2. Description of Related Art

Automotive touchscreens have become increasingly popular as they replace traditional physical buttons in motor vehicles and allow users to control various functions in a car such as in-vehicle infotainment (IVI), navigation, radio, climate and settings in more flexible and versatile manners.

However, touchscreens are more prone to errors and failures than physical buttons and thus require resetting to clear any pending errors or events and to bring a system to normal condition or an initial state. Unfortunately, resetting the touchscreen commonly requires the car driver first to pull over and stop the car.

Therefore, there is a need for a novel scheme that can overcome the drawbacks of resetting the conventional automotive touchscreens.

SUMMARY OF THE INVENTION

In light of the above, it is an object of the embodiment of the present invention to provide an automotive touchscreen that can facilitate resetting the automotive touchscreen on the road.

According to one embodiment, a resetting system includes a driver and a host. The driver controls a touchscreen and includes a driver communication interface that defines a bus for transferring a transfer signal; and an on-screen display (OSD) device that generates an OSD signal representing a predetermined reset image in response to a predetermined event. The OSD signal superimposes over pixels and graphics data to be rendered on the touchscreen. The host transfers the transfer signal to or from the driver and includes a host communication interface that defines the bus for transferring the transfer signal to or from the driver.

According to another embodiment, a resetting method includes the following steps: determining coordinates of touch points on a touchscreen; determines whether the touch points constitute a predetermined reset gesture in response to a predetermined event; transferring the coordinates of touch points from a driver to a host via a transfer signal if the touch points do not constitute the reset gesture; and generating an on-screen display (OSD) signal representing a reset image if the touch points constitute the reset gesture. The OSD signal replaces the transfer signal to show the reset image on the touchscreen, followed by resetting the driver.

BRIEF DESCRIPTION OF THE DRAWINGS

FIG. 3A to FIG. 3C show some exemplary events and associated event images;

DETAILED DESCRIPTION OF THE INVENTION

Figure 1:
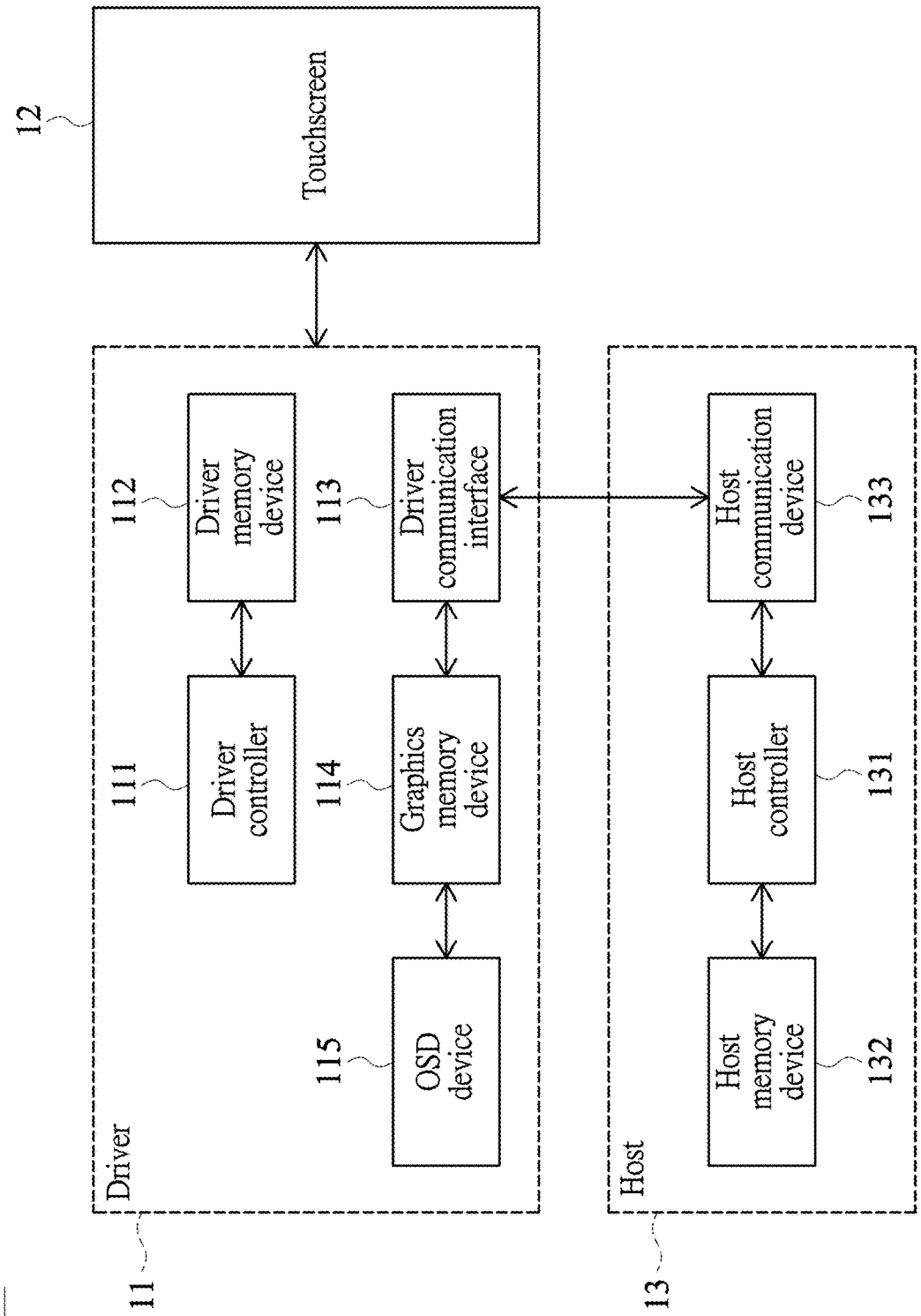
FIG. 1 shows a block diagram illustrating a resetting system without resetting power supply according to one embodiment of the present invention.

FIG. 1 shows a block diagram illustrating a resetting system 100 without resetting power supply according to one embodiment of the present invention. The resetting system 100 of the embodiment may be adaptable for use with an automotive touchscreen that allows users to control various functions in a car, such as in-vehicle infotainment (IVI), navigation, radio, climate and settings in automotive applications.

The resetting system 100 may include a driver 11 configured to control an (automotive) touchscreen 12. In the embodiment, the driver 11 may include a touch and display driver integration (TDDI) circuit that combines a touch driver and a display driver into one chip for controlling the touchscreen 12, such as an automotive touchscreen in the embodiment.

Specifically, the driver 11 of the embodiment may include a driver controller 111, such as a microcontroller unit (MCU), designed for embedded applications. The driver 11 may include a driver memory device 112, such as a static random-access memory (SRAM), configured to store data received from the driver controller 111 or to be transmitted to the driver controller 111. In the embodiment, the driver memory device 112 may be configured to store coordinates (or positions) of touch points. The driver 11 may include a driver communication interface 113 configured to define a bus for transferring a transfer signal. In one embodiment, the driver communication interface 113 may include a driver serial interface configured to define a serial bus for transferring a serial signal. The driver serial interface may include a Mobile Industry Processor Interface (MIPI) configured to transfer a differential serial signal, for example, adopting low-voltage differential signaling (LVDS) standard.

The resetting system 100 may include a host 13 (for example, a personal computer) configured to transfer the transfer signal to or from the driver 11. In the embodiment, the host 13 may be adopted as an automotive system (or application processor, AP) in automotive applications.

Specifically, the host 13 of the embodiment may include a host controller 131, such as a microcontroller unit (MCU), designed for embedded applications. The host 13 may include a host memory device 132, such as a dynamic random-access memory (DRAM), configured to store data received from the host controller 131 or to be transmitted to the host controller 131. The host 13 may include a host communication interface 133 configured to define the bus for transferring the transfer signal to or from the driver 11. In one embodiment, the host communication interface 133 may include a host serial interface configured to define the serial bus for transferring the serial signal to or from the driver 11. The host serial interface may include a Mobile Industry Processor Interface (MIPI) configured to transfer a differential serial signal, for example, adopting low-voltage differential signaling (LVDS) standard.

The driver 11 may include a graphics (or video) memory device 114, such as a static random-access memory (SRAM), configured to be a framebuffer that stores pixels and graphics data to be rendered (or displayed) on the touchscreen 12. According to one aspect of the embodiment, the driver 11 may include an on-screen display (OSD) device 115 configured to generate an OSD signal representing a predetermined reset image (or icon). The OSD signal as generated can superimpose over the pixels and graphics data to be rendered on the touchscreen 12.

Figure 2:
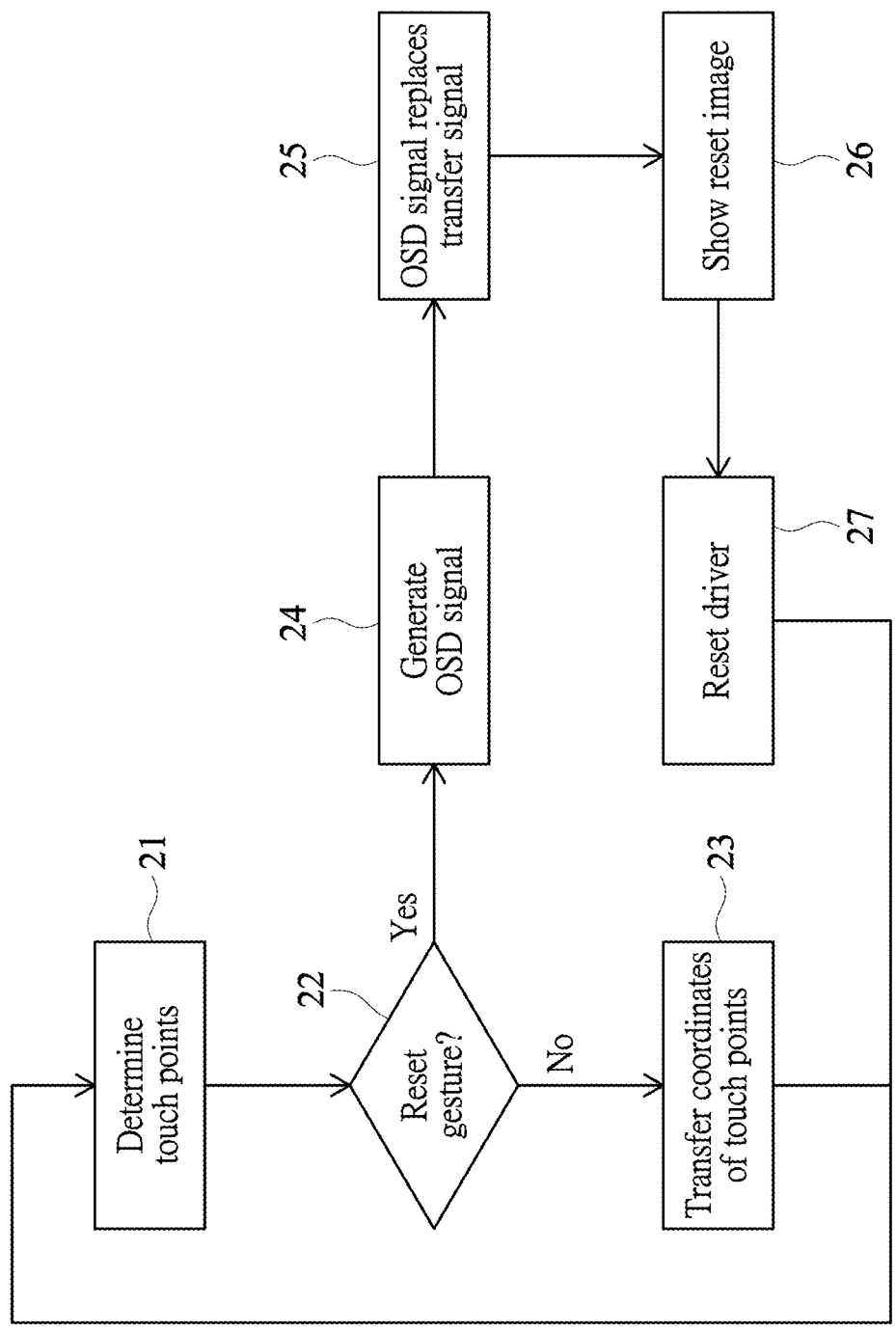
FIG. 2 shows a flow diagram illustrating a resetting method adaptable to the resetting system of FIG. 1.

FIG. 2 shows a flow diagram illustrating a resetting method 200 adaptable to the resetting system 100 of FIG. 1.

Specifically, in step 21, the driver controller 111 (of the driver 11) determines coordinates (or positions) of touch points by a user (e.g., car driver or passenger). Next, in step 22, the driver controller 111 determines whether the touch points constitute a predetermined reset gesture in response to a predetermined event shown in the touchscreen 12. FIG. 3A to FIG. 3C show some exemplary events and associated event images (or icons). The event images may be generated by the OSD device 115. In an alternative embodiment, the predetermined event may be associated with an audio or video alert, instead of showing the event image on the touchscreen 12. In a further embodiment, the predetermined event may be associated with no event images nor audio/video alert, for example, in case that the touchscreen 12 fails seriously.

Figure 4B:
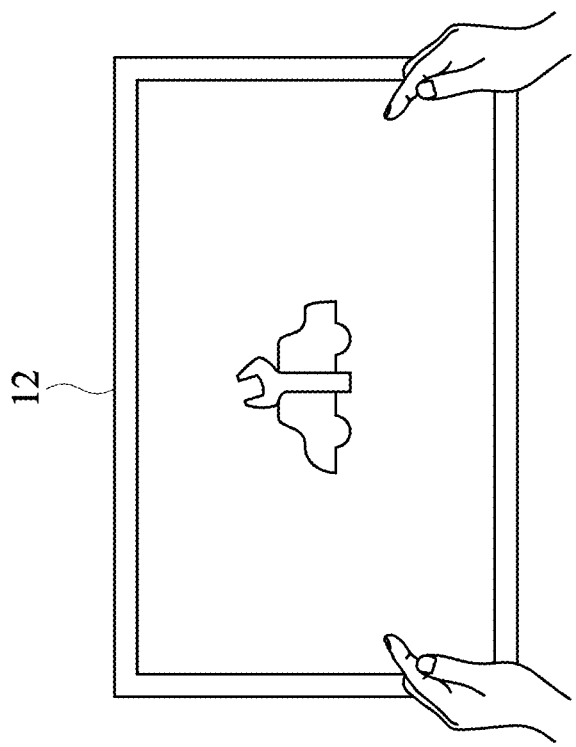
FIG. 4B shows the reset image in response to the reset gesture of FIG. 4A.
Figure 4A:
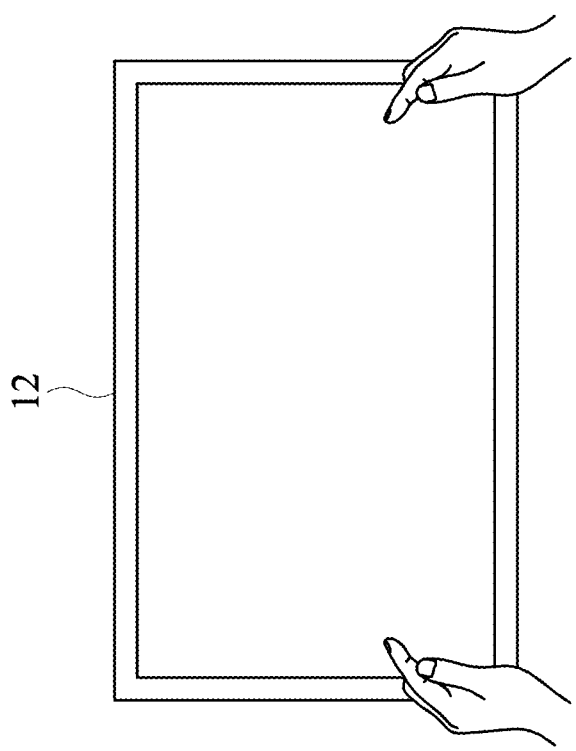
FIG. 4A shows one reset gesture with one hand touched on a lower right corner or a lower left corner of the touchscreen.
Figure 5B:
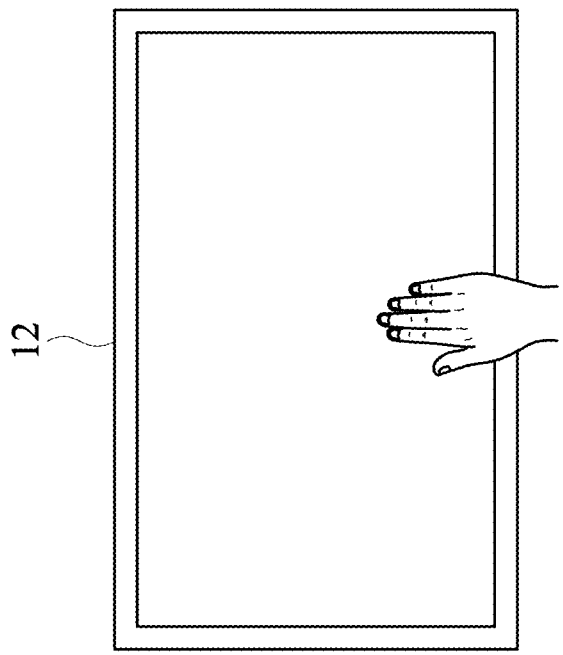
FIG. 5B shows the reset image in response to the reset gesture of FIG. 5A.
Figure 5A:
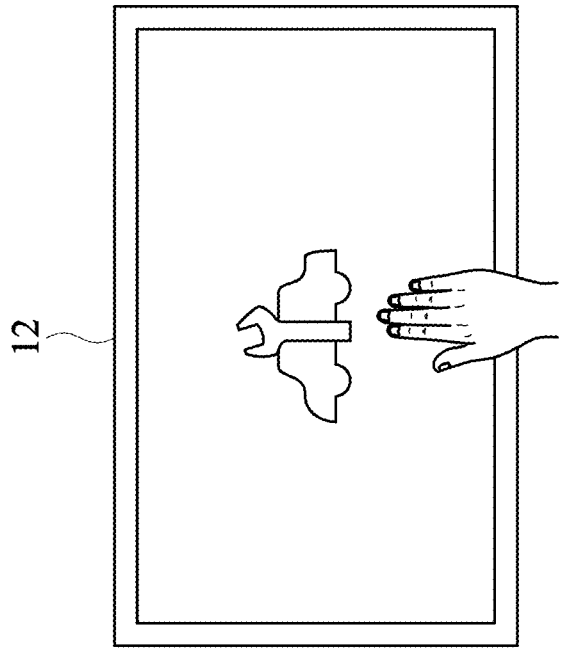
FIG. 5A shows another reset gesture with five fingers touched on lower half of the touchscreen.

When the predetermined event occurs (for example, when the event image is shown on the touchscreen 12), the user may move (at least) a hand or (at least) a finger indicating a reset gesture on the touch screen 12. In one specific embodiment, the reset gesture may be executed by moving one or both hands, for example but not necessarily, on a predetermined area or areas (for example, a corner or corners) of the touchscreen 12 or on the touchscreen 12 for a predetermined duration. FIG. 4A shows one reset gesture with one hand touched on a lower right corner or a lower left corner of the touchscreen 12 (or both). In another specific embodiment, the reset gesture may be executed by moving at least one finger, for example but not necessarily, on a predetermined area of the touchscreen 12 or on the touchscreen 12 for a predetermined duration. FIG. 5A shows another reset gesture with five fingers touched on lower half of the touchscreen 12.

If the driver controller 111 determines that the touch points do not constitute the reset gesture, the coordinates of touch points are transferred (from the driver 11) to the host 13 via the transfer signal (step 23), and the flow goes back to step 21.

On the other hand, if the driver controller 111 determines that the touch points constitute the reset gesture, the OSD device 115 generates the OSD signal representing the reset image (step 24), and the transfer signal is replaced by the OSD signal (step 25), thereby showing the reset image on the touchscreen 12 by superimposing the OSD signal over the pixels and graphics data (of the graphics memory device 114) to be rendered on the touchscreen 12 (step 26). FIG. 4B shows the reset image in response to the reset gesture of FIG. 4A, and FIG. 5B shows the reset image in response to the reset gesture of FIG. 5A. Subsequently, in step 27, the driver 11 is reset. The flow then goes back to step 21. Accordingly, the car driver or passenger can reset the touchscreen 12 on the road (not via a physical button) without pulling over and stopping the car.

Although specific embodiments have been illustrated and described, it will be appreciated by those skilled in the art that various modifications may be made without departing from the scope of the present invention, which is intended to be limited solely by the appended claims.

What is claimed is:

1. A resetting system, comprising:
   a driver that controls a touchscreen, the driver including:
      a driver communication interface that defines a bus for transferring a transfer signal;
      a driver controller;
      an on-screen display (OSD) device that generates an OSD signal representing a predetermined reset image in response to a predetermined event, the OSD signal superimposing over pixels and graphics data to be rendered on the touchscreen; and
   a host that transfers the transfer signal to or from the driver, the host including a host communication interface that defines the bus for transferring the transfer signal to or from the driver,
   wherein the OSD device generates the OSD signal representing the reset image if touch points constitute a predetermined reset gesture as determined by the driver controller, and the OSD signal then replaces the transfer signal to show the reset image on the touchscreen, followed by resetting the driver by the host.

2. The resetting system of claim 1, wherein the driver comprises a touch and display driver integration (TDDI) circuit.

3. The resetting system of claim 1, wherein the touchscreen comprises an automotive touchscreen.

4. The resetting system of claim 1, wherein the driver further comprises:
   a driver memory device that stores coordinates of touch points.

5. The resetting system of claim 1, wherein the driver communication interface comprises a driver serial interface that defines a serial bus for transferring a serial signal.

6. The resetting system of claim 5, wherein the driver serial interface comprises a Mobile Industry Processor Interface (MIPI) configured to transfer a differential serial signal adopting low-voltage differential signaling (LVDS) standard.

7. The resetting system of claim 1, wherein the host further comprises:
   a host controller; and
   a host memory device that stores data received from the host controller or to be transmitted to the host controller.

8. The resetting system of claim 1, wherein the host communication interface comprises a host serial interface configured to define a serial bus for transferring a serial signal to or from the driver.

9. The resetting system of claim 8, wherein the host serial interface comprises a Mobile Industry Processor Interface (MIPI) configured to transfer a differential serial signal adopting low-voltage differential signaling (LVDS) standard.

10. The resetting system of claim 1, wherein the driver further comprises:
    a graphics memory device that stores the pixels and graphics data to be rendered on the touchscreen.

11. A resetting method, comprising:
    determining coordinates of touch points on a touchscreen;
    determines whether the touch points constitute a predetermined reset gesture in response to a predetermined event;
    transferring the coordinates of touch points from a driver to a host via a transfer signal if the touch points do not constitute the reset gesture; and generating an on-screen display (OSD) signal representing a reset image if the touch points constitute the reset gesture, the OSD signal replacing the transfer signal to show the reset image on the touchscreen, followed by resetting the driver.

12. The resetting method of claim 11, wherein the predetermined event is indicated by an associated event image.

13. The resetting method of claim 12, wherein the event image is represented by an on-screen display (OSD) signal.

14. The resetting method of claim 11, wherein the reset gesture is executed by moving a hand or a finger indicating the reset gesture on the touch screen.

15. The resetting method of claim 14, wherein the reset gesture is executed by moving one or both hands on a predetermined area or areas of the touchscreen or on the touchscreen for a predetermined duration.

16. The resetting method of claim 15, wherein the predetermined area comprises a corner or corners of the touchscreen.

17. The resetting method of claim 14, wherein the reset gesture is executed by moving at least one finger on a predetermined area of the touchscreen or on the touchscreen for a predetermined duration.

18. The resetting method of claim 17, wherein the predetermined area comprises lower half of the touchscreen.

19. The resetting method of claim 11, wherein the reset image is shown on the touchscreen by superimposing the OSD signal over pixels and graphics data to be rendered on the touchscreen.

20. The resetting method of claim 11, wherein the touchscreen comprises an automotive touchscreen.

* * * * *